United States Patent Office 3,385,654
Patented May 28, 1968

3,385,654

STERILIZING METHOD AND COMPOSITION THEREFOR

Michel N. Yardney, New York, and Carl Horowitz, Brooklyn, N.Y., assignors to Yardney International Corp., New York., N.Y., a corporation of New York No Drawing. Filed Dec. 11, 1963, Ser. No. 329,874
13 Claims. (Cl. 21—58)

ABSTRACT OF THE DISCLOSURE

An antimicrobially effective metal compound and a method for utilizing the same in sterilizing the atmosphere of a room. The preferred metal compound is a silver salt of a lower fatty acid, thus a silver hexanoate, octanoate or decanoate. This salt is admixed with an excess of caprioic, caprylic or capric acid, preferably in a quantity of about 1 to 10 moles of fatty acid per mole of silver salt, with the optimum concentration of the metal compound ranging between approximately 0.005% and 5% by weight of the overall composition.

The antimicrobially effective ammoniacal aqueous medium containing the fatty-acid salt of silver is dispersed in the atmosphere in a substantially saturating concentration with a content of about 1–25 mg. of silver salt per cubic meter of atmosphere and with a particle size ranging between substantially 1 and 25 microns.

Our present invention relates to an antimicrobially effective composition and a method of utilizing same in sterilizing the atmosphere of a room, e.g. in hospitals. The term "room," as used herein, encompasses any air-filtered enclosure which may be subject to contamination.

An important object of our invention is to provide an antimicrobially effective composition which can be applied to the atmosphere of a room to be decontaminated in such manner that its sterilizing action persists for several days or longer, even with repeated airing of the room.

A related object of this invention is to provide a method of so distributing such a composition in the atmosphere of the room as to maintain the desired effectiveness by allowing its particles to settle in a slow and sustained fallout on walls and other objects from which they will continue to exert a sterilizing effect upon the surrounding air, thereby regenerating the antimicrobial character of the atmosphere even in the presence of drafts or ventilation.

Some antimicrobially effective compositions, particularly those based upon compounds of oligodynamic metals, are known to result in objectionable discoloration of wall surfaces as well as garments, sheets and other articles when sprayed into the air in concentrations hitherto deemed necessary for maximum effectiveness. If the oligodynamic metal is silver, such discoloration is generally due to an oxidation process promoted by the incidence of light, specifically ultravoilet rays; in commonly assigned application Ser. No. 187,917, filed Apr. 16, 1962, and now abandoned, by Carl Horowitz, it has therefore been proposed to admix with a silver-containing composition a protective agent designed to minimize the discoloring effect of incident radiation. Thus, it is a more particular object of our present invention to provide a method of atmospherically distributing a silver-containing antimicrobial composition in a manner avoiding such discoloration without the use of special protective agents.

We have discovered, in accordance with the present invention, that the foregoing objects can be realized by dispersing an antimicrobially effective metal compound in the atmosphere of a room, which is to be decontaminated, in a concentration of about 1 to 25 milligrams per cubic meter of atmosphere and with a particle size small enough to maintain the compound suspended in the air for a prolonged period, of the order of several days or longer, to achieve the desired sustained fallout and regeneratively antimicrobial effect.

According to a more specific feature of our invention, the compound is an organic salt of an oligodynamic metal, silver in particular, and is at least partly dissolved in an aqueous vehicle. For best results, this vehicle is dispersed as in fog, mist or spray in the atmosphere so as to form droplets ranging between approximately 1 and 25$\mu$ in size. Some of these small particles will remain floating on the atmosphere for a prolonged period while others will settle on the nearest surfaces where the vehicle will promptly evaporate before the incident visible or ultraviolet radiation can react with the metal compound.

The preferred metal compound used in the practice of our present invention is a silver salt of a lower fatty acid, specifically caproic, caprylic or capric acid, thus a silver hexanoate, octanoate or decoanoate. This salt is advantageously admixed with an excess of caproic, caprylic or capric acid, preferably in a quantity of about 1 to 10 moles of fatty acid per mole of silver salt, and vehicle for the mixture containing a substantial concentration of ammonium ions, as disclosed in commonly assigned application Ser. No. 272,201, filed Apr. 11, 1963 by Henry Groh and Carl Horowitz. We have further found, according to another aspect of the present invention, that the optimum concentration of the metal compound ranges between approximately 0.005% and 5%, by weight, of the overall composition.

Among metals known to have oligodynamic properties, and therefore suitable for atmospheric decontamination by dispersion in fog, mist or spray form, there may be mentioned (besides silver) gold, platinum, mercury, zinc, tin and copper. In the following detailed description, however, reference will be specifically made to the organic silver compounds referred to above.

The silver salts of fatty acids, including particularly the caproates, caprylates and caprates, are initially colorless, or substantially so, when dissolved or suspended in an aqueous medium. These salts, or any combination thereof, are advantageously suspended and at least partly dissolved in a somewhat alkaline aqueous liquid, preferably an ammoniacal preparation having a pH of about 7.5 to 8 (e.g. and aqueous solution containing the ions of an ammonium salt of a weak acid, such as ammonium carbonate). The concentration of ammonium ion ranges preferably between approximately 0.005% and 0.5% by weight.

EXAMPLE I

A concentrate comprising a mixture of silver caprylate and caprylic acid in an aqueous vehicle, in a quantity of 2% by weight (equivalent to 0.86% silver) and in the presence of a like proportion of ammonia, is prepared as follows:

144 grams of caprylic acid and 116 grams of silver oxide ($Ag_2O$) are intimately mixed in a mortar until the heat evolved in sufficient to effect complete reaction of the silver oxide with all of the caprylic acid (as evidenced by the formation of a homogeneous product). The resulting silver caprylate is found to contain 43% silver by weight. Two parts by weight of the solid silver caprylate are dissolved in 98 parts of a 6.6% solution of ammonium hydroxide (2% ammonia by weight), corresponding to about 2.12% of ammonium ion, and the solution is permitted to stand for 1 hour and then filtered. The filtrate is aged for an additional period of 8 hours and brought to pH of 11.5 by the addition of a slight amount of concentrated aqueous ammonia solution (30% ammonia), the ammonia concentration of the composition then being about 4% by weight.

The above concentrate, stored in a light-tight container, is then diluted 100 times with warm tap water and sprayed into the air of a room to be sterilized, from an opaque or darky translucent bottle, by a suitable atomizer adapted to produce droplets of an average size of about 12 microns. The rate of spray is so chosen that the saturation point, corresponding to approximately 70 cc. of liquid per cubic meter of air, is reached after 20 minutes of continuous fogging.

The room containing the spray-laden atmosphere is then sealed off for two hours, whereupon doors and windows are opened and normal use is resumed. The microbial count of the air, as measured on agar plates exposed to the atmosphere, drops sharply upon fogging and returns to its normal level only gradually, over a period of one to two weeks. This is shown in the following tables in which we have reproduced the results of tests carried out in two different groups of five rooms each, with an air volume of about 20 m.³ per room. The normal count per cubic meter for a twenty-four-hour period, as averaged over five days prior to the decontamination test, was 700 for the first group (Table A) and 400 for the second group (Table B). The samples were collected in five open Petri dishes per room, 100 x 15 mm. in size, which were left exposed to the atmosphere for one hour each day. It is interesting to note that, in the first test series, the maximum decontamination occurred not immediately after fogging but only a day later.

All the rooms were in normal use during the test period and were subjected daily to routine cleaning; samples were taken four hours after cleaning. The Petri dishes were positioned in the floor area of the room and, after exposure, were incubated for 48 hours at 37° C. before the count was taken.

TABLE A

| Number of days: | Number of colonies per m.³ per 24-hour period |
| --- | --- |
| 1 | 450 |
| 2 | 140 |
| 3 | 170 |
| 4 | 280 |
| 5 | 170 |
| 6 | 200 |
| 7 | 170 |
| 8 | 200 |
| 9 | 220 |
| 10 | 220 |
| 11 | 280 |
| 12 | 420 |
| 13 | 390 |
| 14 | 620 |
| 15 | 700 |
| 16 | 700 |
| 17 | 700 |
| 18 | 700 |

TABLE B

| Number of days: | Number of colonies per m.³ per 24-hour period |
| --- | --- |
| 1 | 140 |
| 2 | 200 |
| 3 | 200 |
| 4 | 250 |
| 5 | 220 |
| 6 | 370 |
| 7 | 400 |
| 8 | 400 |

Fallout test

During a 20-minute fogging operation as described above, and for an hour thereafter, two samples of white fabric and three samples of white paper were left in the room to collect settling particles of mist. The quantity collected amounted to about 20 cc., corresponding to approximately 4 milligrams of solids, per square meter. There was no discoloration.

Each sample had a size of about 20 x 30 cm. 24 hours after exposure, the surfaces of the five samples were swabbed with sterile cotton and the swabbings were transferred onto sterile plates containing blood agar. After a 24-hour incubation period, the colony count for each sample was as given in Table C below.

TABLE C

| Sample: | Number of colonies |
| --- | --- |
| Paper No. 1 | 0 |
| Fabric No. 1 | 4 |
| Paper No. 2 | 0 |
| Fabric No. 2 | 6 |
| Paper No. 3 | 0 |

In a control test, in which similar samples were exposed for a like period without preliminary fogging, the swabbings from their surfaces showed an overgrowth of colonies too numerous to count.

In a further test, samples identical with those described above were exposed directly to the spray at a distance of 30 cm. from the atomizer nozzle. The colony counts of these samples, obtained from swabbings in the manner previously described, are tabulated as follows:

TABLE D

| Sample: | Number of colonies |
| --- | --- |
| Paper No. 1 | 0 |
| Fabric No. 1 | 1 |
| Paper No. 2 | 15 |
| Fabric No. 2 | 0 |
| Paper No. 3 | 3 |

Toxicity

The concentrate produced in accordance with Example I was tested for acute oral toxicity on Carworth mice; its $LD_{50}$ was found to be 2 grams per kilogram of body weight.

To test the safety of the mist upon direct inhalation, 20 male Belgian hares (each weighing about 1500 grams) were exposed to a spray stream according to the preceding example but with only 1:10 dilution of the concentrate, thus with tenfold concentration, for two hours a day over a 14-day period. The fallout from the spray was allowed to settle on the animals as well as their cages, food and water during the entire period.

The animals, all of which survived the tests, were then sacrificed and, upon autopsy, found not to exhibit any gross or microscopic pathology.

EXAMPLE II

The procedure according to Example I was modified by the use of an initial quantity of 1152 grams of caprylic acid, corresponding to an excess of 7 moles of acid per mole of resulting silver salt. The concentrate thus obtained is employed in the same manner as that of Example I, with similar results.

Instead of silver caprylate, or in addition thereto, silver caproate and/or silver caprate as well as their respective acids may be used in an analogous manner and with comparable effectiveness.

What is claimed is:

1. A method of sterilizing the atmosphere of a room, comprising the steps of dispersing an antimicrobially effective ammoniacal aqueous medium, containing at least one fatty-acid salt of silver, in said atmosphere in a substantially saturating concentration with a content of about 1 to 25 mg. of said silver salt per cubic meter of atmosphere and with a particle size ranging between substantially 1 and 25 microns.

2. A method as defined in claim 1 wherein said salt is selected from the group which consists of silver hexanoate, silver octanoate and silver decanoate.

3. A method as defined in claim 2 wherein said aqueous medium further contains a fatty acid selected from the group which consists of caproic, caprylic and capric acids.

4. A method as defined in claim 3 wherein said fatty acid is present in a proportion ranging between substantially 1 and 10 moles per mole of silver salt.

5. A method of sterilizing the atmosphere of a room, comprising the steps of dispersing an antimicrobially effective ammoniacal aqueous medium, containing at least one fatty acid salt of silver, in said atmosphere in an amount sufficient to effect said sterilization.

6. A method of destroying pathogenic microorganisms which comprises applying to said microorganisms a microbicidal amount of a fatty-acid salt of a silver compound dispersed in an ammoniacal aqueous medium.

7. A method as defined in claim 6 wherein said medium additionally contains a fatty acid.

8. A method as defined in claim 7 wherein said salt is silver caprylate and said acid is caprylic acid.

9. A method as defined in claim 7 wherein said salt is selected from the group consisting of silver hexanoate, silver octanoate and silver decanoate, and said acid is selected from the group consisting of caproic, caprylic and capric acids.

10. An antimicrobial spray comprising an ammoniacal aqueous vehicle having a silver salt of a fatty acid at least partly dissolved therein, the proportion of said silver salt ranging between substantially 0.005% and 5%, by weight, said salt being selected from the group consisting of silver hexanoate, silver octanoate and silver decanoate, said aqueous vehicle further containing a fatty acid selected from the group which consists of caproic, caprylic and capric acids.

11. An antimicrobial spray as defined in claim 10 wherein said fatty acid is present in a proportion ranging substantially 1 and 10 moles per mole of silver salt.

12. An antimicrobial spray as defined in claim 11 wherein said vehicle contains ammonium ion in a concentration ranging between substantially 0.5% and 0.005% by weight.

13. An antimicrobial spray as defined in claim 12 wherein said silver salt is silver octanoate.

References Cited

UNITED STATES PATENTS

| | | | |
|---|---|---|---|
| 1,633,466 | 6/1927 | Traxl | 167—72 X |
| 1,864,073 | 6/1932 | Kohn et al. | 167—19 X |
| 2,394,325 | 2/1946 | Muller | 21—58 |
| 2,416,074 | 2/1947 | Weber et al. | 260—414 |
| 2,562,488 | 7/1951 | Fuchs | 167—22 |
| 2,902,400 | 9/1959 | Moudry et al. | 167—22 X |
| 3,085,909 | 4/1963 | Gagliardi et al. | 167—22 X |
| 3,255,223 | 6/1966 | Groh | 260—414 |

OTHER REFERENCES

Whitby, G. S., Proceedings of Royal Society of Canada, vol. 13, 1919, page 257.

MORRIS O. WOLK, *Primary Examiner.*

MICHAEL E. ROGERS, *Examiner.*

R. E. SERWIN, *Assistant Examiner.*